United States Patent

[11] 3,615,218

[72] Inventors   Leo B. Post
                 New City, N.Y.;
                 Roy E. Paul; William R. Crudup,
                 Columbia, Tenn.
[21] Appl. No.   750,192
[22] Filed       Aug. 5, 1968
[45] Patented    Oct. 26, 1971
[73] Assignee    Stauffer Chemical Company
                 New York, N.Y.

[54] RECOVERY OF PHOSPHORUS VALUE FROM PHOSPHORUS SLUDGE
     8 Claims, 2 Drawing Figs.
[52] U.S. Cl. .................................................... 23/223,
                                                                23/312 P
[51] Int. Cl. ............................................... C01b 25/04
[50] Field of Search ........................................ 23/312 P,
                                                                 223

[56]                References Cited
              UNITED STATES PATENTS
3,437,379   4/1969   Dunseth et al. ............... 23/312 P FOREIGN PATENTS
653,094   11/1962   Canada ........................ 23/223
                OTHER REFERENCES
Van Wazer, Phosphorous and Its Compounds, Vol. 1, pp 107–108 (Interscience 1958)

Primary Examiner—Oscar R. Vertiz
Assistant Examiner—Charles B. Rodman
Attorneys—Wayne C. Jaeschke, Daniel S. Ortiz and Martin Goldwasser ABSTRACT: A process for recovering phosphorus values from phosphorus sludge comprising (1) mixing the sludge with from about 1 to about 8 parts by weight carbon bisulfide per part by weight phosphorus sludge; (2) agitating the mixture to a Reynolds number value of from about $2 \times 10^5$ to about $1.0 \times 10^6$ for a period of from about 0.2 minute to about 16 minutes; (3) filtering the resulting mixture to remove particulate material and thereafter recovering the phosphorus value from the carbon bisulfide fraction.

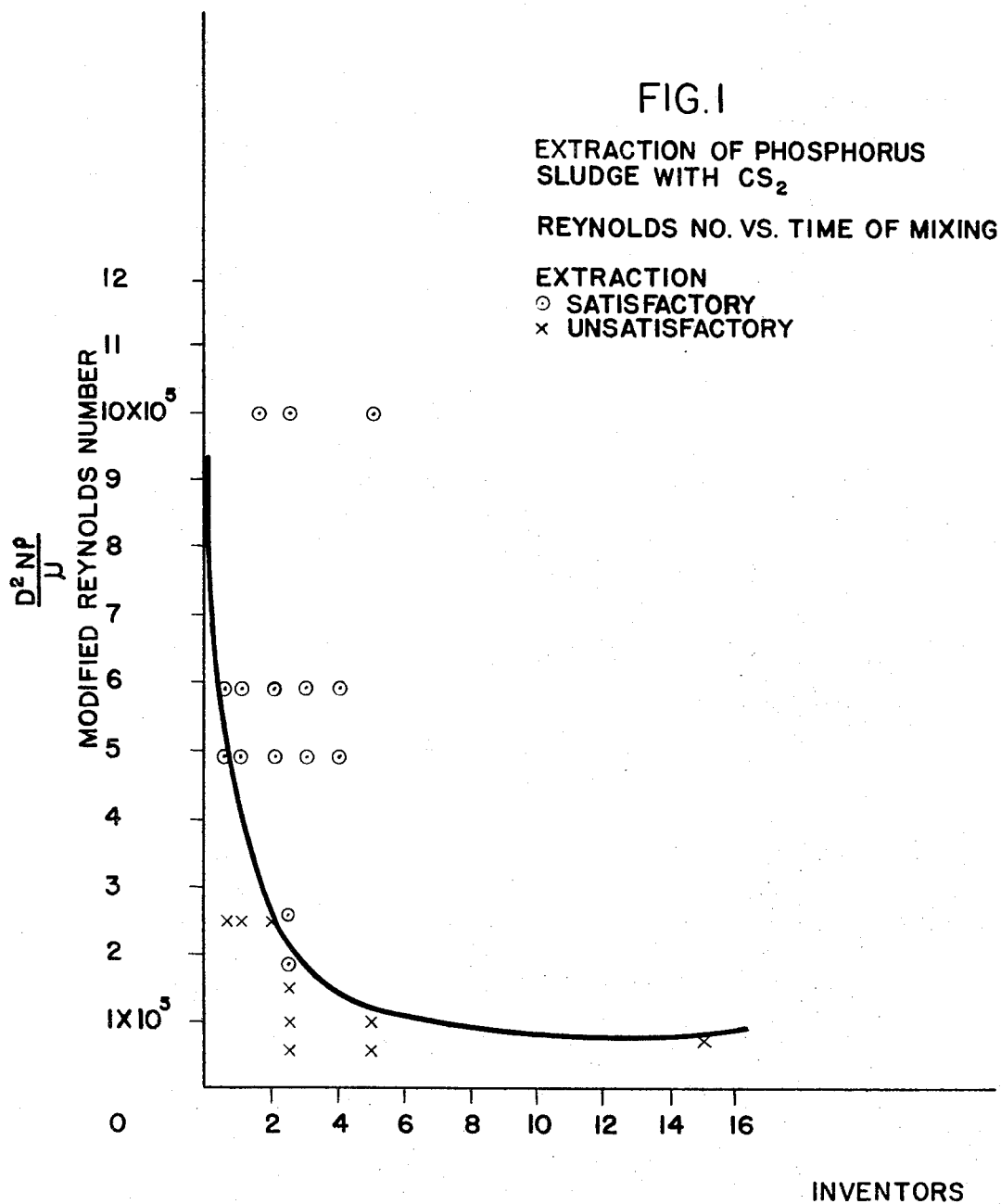

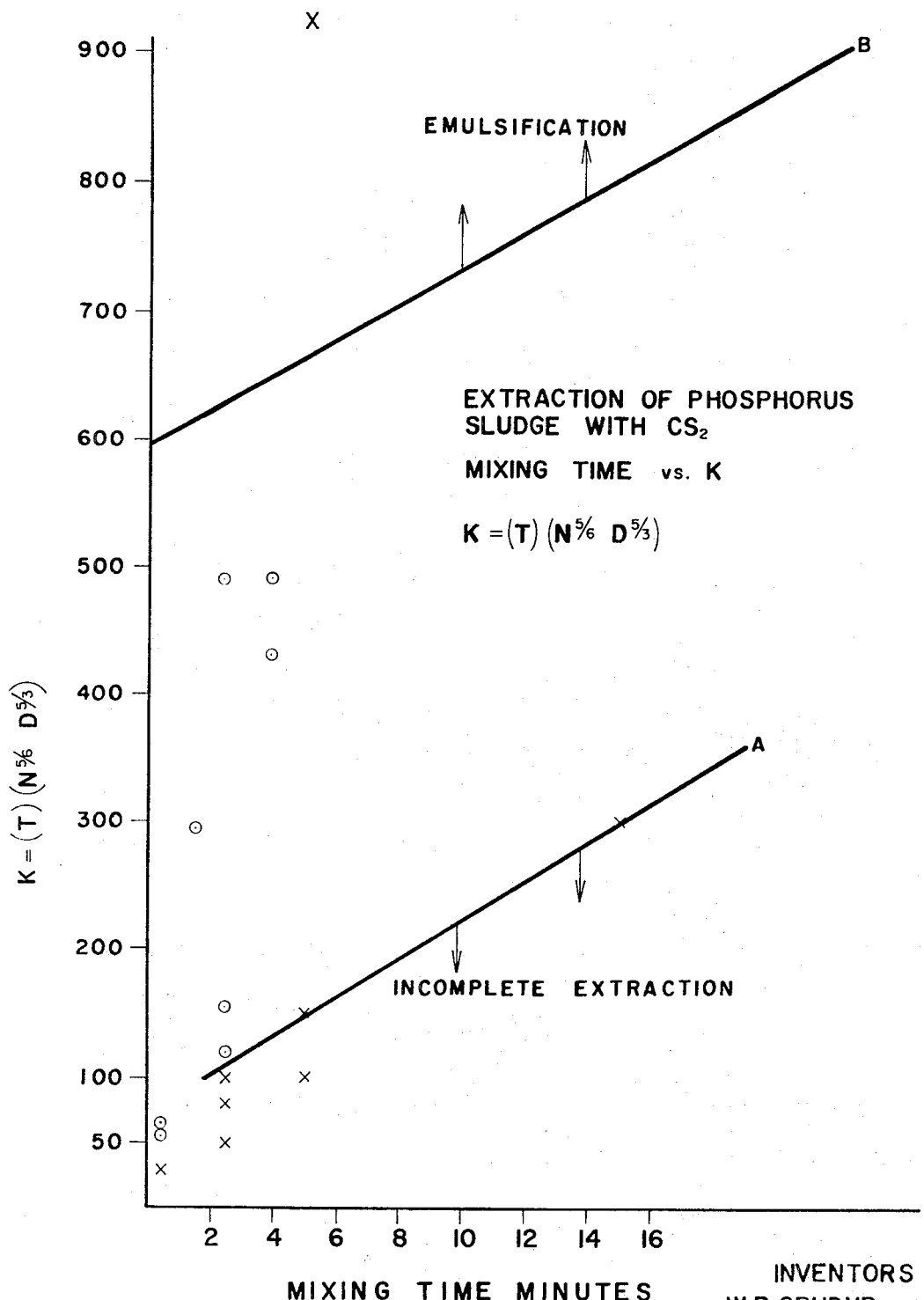

RECOVERY OF PHOSPHORUS VALUE FROM PHOSPHORUS SLUDGE

The present invention relates to a method of recovering phosphorus value from phosphorus sludge generated by the electric furnace process for obtaining phosphorus.

In the electric furnace process for preparing phosphorus phosphate-bearing ore, rock or earth is charged to an electric furnace with silica and carbon, usually in the form of coke or coal. The electric furnace is heated to a sufficient temperature to melt the charge and the phosphorus generated is remove as a vapor with carbon monoxide gas. This gas, however, as it leaves the furnace entrains minute particles of carbon, phosphate rock and other materials present in the furnace. The phosphorus-containing stream is generally passed then to a hot gas precipitator which removes a large portion of the entrained solids and the stream is continued through a hood-type condenser before it is exhausted through a spray tower. The phosphorus vapor is condensed by cooling with water. The greater proportion of condensed phosphorus separates and is filtered to removed residual dirt particles. An interface layer, however is produced comprising an emulsion of phosphorus, water and fine solids which have become entrained in the gas stream. This emulsion is termed "phosphorus sludge" in the art. The amount of phosphorus sludge produced by a phosphorus furnace and the phosphorus content of the sludge are variable dependent upon many factors such as the composition of the phosphate rock charged initially and the operating conditions and design of the furnace. The phosphorus sludge can contain from about 15 to about 85 percent by weight phosphorus. Accordingly, the generation of phosphorus sludge represents a loss of phosphorus from the production process and must be recovered if economic production is to be attained. The recovery process affects the efficiency of the operation to a considerable degree. While proposed process such as dry condensation avoid the production of phosphorus sludge in that water is not present in the condensation, the majority of phosphorus plants are now producing in the United States utilize water condensers, and accordingly sludge formation is a large problem.

The phosphorus sludge produced can vary from 10 to 60 percent of furnace output of phosphorus.

Since it contains a relatively high percentage of phosphorus, it is important to recover this phosphorus immediately. It is normally stored in tanks until it can be treated to recover the phosphorus. Many methods have been proposed in the past for the recovery of the phosphorus value from the sludge. Such methods have included centrifugation, gravity settling, extreme pressure filtration, and steam distillation or vaporization. None of these methods, however, have proven to be completely satisfactory, either from a production standpoint or from an economic standpoint. The phosphorus/water/dirt emulsion is extremely stable and is very difficult to break at normal temperatures.

FIG. 1 is a graph showing the curve formed by plotting mixing time in minutes against the degree of agitation in units of modified Reynolds numbers for phosphorus sludge extracted with carbon bisulfide. This curve demarks the boundary between satisfactory and unsatisfactory extraction.

FIG. 2 is a graph showing mixing time in minutes against the constant K. The two curves A and B demark the boundaries between incomplete and emulsification. The area defined by curves A and B establish the critical criteria for the conduct of this invention.

Until the present time, no completely satisfactory means for recovering the phosphorus value from phosphorus sludge has been proposed.

Therefore, in accordance with the present invention, a process is provided for effectively recovering phosphorus values from phosphorus sludge comprising the steps of admixing the phosphorus sludge with from about 2 to about 8 or more parts by weight carbon bisulfide per part of phosphorus sludge, agitating the resulting carbon bisulfide/phosphorus sludge mixture to achieve a Reynold's number range from about $1 \times 10^5$ to about $1 \times 10^6$ at a temperature of from about 15° to about 45° C. until a substantial portion of the phosphorus has been dissolved in the carbon bisulfide, filtering the resulting mixture to remove the dirt present, and recovering the phosphorus from the carbon bisulfide fraction by conventional means.

A modified Reynold's number also known as an impeller Reynold's number as utilized in the description of this invention is defined as $$(D^2 N \rho)/\mu$$

wherein D is the agitator diameter in feet, N is the agitator speed in revolutions per second, $\rho$ is the liquid density in pounds per cubic foot, and $\mu$ is the liquid viscosity in pounds per foot second. For purposes of the present invention, the liquid density $\rho$ and liquid viscosity $\mu$ is taken for carbon bisulfide which are 78.2 and $0.333 \times 10^{13}$, respectively. Accordingly, these values are constants in the formula above as used herein.

While the degree of agitation as indicated by the Reynold's number in this process is critical, as is known in the art, these values can vary slightly depending upon the type of equipment being used. Although it has been found that agitation as typified by a modified Reynold's number of from $1.0 \times 10^5$ to about $1.0 \times 10^6$ establishes the critical range of agitation in this process, the preferred range is $4 \times 10^5$ to $1.0 \times 10^6$.

The period of time for which the carbon disulfide/phosphorus sludge is agitated is equally critical in the process of this invention and is used to further define the upper limit of agitation. Time of mixing in seconds in this invention has been found to have the following relationship:

T = time of mixing in seconds
N = speed of agitator r.p.s.
D = diameter of agitator in ft.
$T = K/(N^{5/6} D^{5/3})$ When a low degree of agitation as represented by low Reynold's numbers (less than $10^5$) is employed, extraction is difficult and the mixing time must be extended beyond 15 minutes. Even with such an extended time of mixing the extraction may or may not be effective. As Reynold's numbers higher than $8 \times 10^5$ are encountered, extraction can take place in very short periods of time. If however, long mixing times are employed with high Reynold's numbers, i.e. high agitation, then total emulsification of the carbon bisulfide and the phosphorus sludge can take place. Accordingly limits are established. These limits can be calculated and be represented by the constant K $$K \times (T) (N^{5/6} D^{5/3})$$

When this value exceeds 600, danger of complete emulsification exists. For the preferred range of Reynold's number ($4 \times 10^5$ to $10^6$) K would be 100 to 600 for best results when time of mixing is 2 minutes or less, and 250 to 750 when time of mixing is 10 minutes.

The relationship of Reynold's numbers and $N^{5/6} D^{5/3}$ relationship have both been plotted against mixing time to further demonstrate the desirable range of mixing.

It should be noted that the mere admixture of carbon bisulfide with phosphorus sludge standing without agitation is insufficient to break the emulsion of phosphorus/dirt/water in the sludge and relatively little phosphorus, if any, is leached from the sludge composition.

The amount of carbon bisulfide which can be used with the phosphorus sludge to effectively recover phosphorus values therefrom is generally from about 200 to about 800 parts by weight carbon bisulfide per 100 parts phosphorus sludge, although greater amounts can be employed if desired. Preferred amounts of carbon bisulfide are from about 300 to about 500 parts by weight per 100 parts phosphorus sludge. It should be recognized that while large excesses of carbon bisulfide can be effective in dissolving the phosphorus in the phosphorus sludge unless such extraction is done with adequate agitation, the process will be inefficient. Also, a large excess of carbon bisulfide must be recovered and can lead to solvent losses. If too little carbon bisulfide is used, all phosphorus values are not recovered from the sludge, and the phosphorus values are not recovered from the sludge, and the phosphorus, $CS_2$ solution is difficult to handle.

The temperature at which the reaction is conducted can vary from about $-10°$ to about $80°$ C. It has been found preferred, however, to conduct this separation at a temperature of from about $15°$ to about $45°$ C. This temperature is preferred because it provides excellent separation and breaking of the emulsion at a relative minimum of heat expenditure.

The types of equipment which can be used in the present operation are well known to those skilled in the art. For example, included among the agitators which can be used are turbine, propeller or paddle type of all shapes and sizes whose dimensions and speed will provide a degree of agitation as represented by the modified (or impeller) Reynold's number required. Likewise, other types of mixers could be adapted, but the peripheral speed of the turning components would need to be defined by the modified Reynold's number range.

Similarly, other types of mixing can be employed as for example Venturi-type mixers of gas sparging, provided the proper degree of agitation and mixing duration is maintained. Such mixing can be defined by Reynold's numbers by the formula:

$$DV\rho/\mu$$

wherein D is the diameter of the mixer or pipe at the throat in feet; V is the linear velocity of the fluid in feet/second; $\rho$ is the liquid density in pounds/cubic feet and $\mu$ is the liquid viscosity in pounds/foot-second.

After the sludge has been mixed with the carbon bisulfide, agitated for the requisite period of time, under the conditions indicated above, the emulsion is broken and the mixture has a relatively low viscosity. This low-viscosity mixture is effectively filtered to remove dirt particles which serve to form the emulsion, and the mixture of carbon bisulfide containing dissolved phosphorus is passed on to the next stage in a dirt-free condition. Any type of conventional filtration equipment can be utilized for dirt removal, such as pressure leaf or tube filters, centrifuges, drum rotary filters, or plate and frame filters.

The water can be separated from the carbon bisulfide layer by decantation or other suitable means. The carbon bisulfide fraction is then stripped of carbon bisulfide leaving relatively pure phosphorus which is recovered directly. The stripping operation to remove the carbon bisulfide can be effected at atmospheric pressure or reduced pressure. This is generally accomplished at a temperature of from $100°$ to about $125°$ C.

The present process can be conducted as a batch or continuous process, utilizing equipment and techniques well known in the art.

Throughout the specification and in the examples which follow all parts and percentages are by weight unless otherwise specifically indicated.

EXAMPLE 1

Recovery of Phosphorus From Sludge by Extraction With Carbon Bisulfide

In this example 140 parts by weight of phosphorus sludge at approximately 40 percent P+ as obtained from a conventional phosphorus electric furnace were charged to a blender (actually, a "Sunbeam" kitchen blender) equipped with a 2 1/8 inch diameter propeller-type agitator. To this were charged 250 parts by weight carbon bisulfide. Utilizing this agitator system with the identical amounts of carbon bisulfide, tests were made at various agitator speeds and revolutions per minute for varying time periods. The conditions of extraction as well as the results of the extraction are set forth in table I below:

TABLE I (2⅛" diameter agitator)

| Test | Time (min.) | R.p.m. | Results* | Modified Reynold's number | K |
|---|---|---|---|---|---|
| A | 15 | 500 | Unsatisfactory | $6.3\times10^4$ | 300 |
| B | 5 | 500 | do | $6.3\times10^4$ | 100 |
| C | 2.5 | 500 | do | $6.3\times10^4$ | 50 |
| D | 2.5 | 800 | do | $1.0\times10^5$ | 78 |
| E | 5 | 800 | do | $1.0\times10^5$ | 156 |
| F | 2.5 | 1,200 | do | $1.5\times10^5$ | 100 |
| G | 2.5 | 1,500 | Satisfactory-borderline. | $1.9\times10^5$ | 122 |
| H | 2.5 | 2,000 | Good Separation | $2.5\times10^5$ | 156 |
| I | 1.5 | 8,000 | do | $1.0\times10^6$ | 296 |
| J | 2.5 | 8,000 | do | $1.0\times10^6$ | 494 |
| K | 5.0 | 8,000 | Emulsified | $1.0\times10^6$ | 1,000 |

*Results.—
Unsatisfactory—emulsion not broken.
Satisfactory-borderline—emulsion partly broken.
Good Separation—emulsion completely broken.
Emulsified—emulsion reformed.

We filtered the solution and then evaporated the $CS_2$ only enough times to show the feasibility of such an operation.

EXAMPLE 2

Recovery of Phosphorus From Sludge by Extraction With Carbon Bisulfide Using a 4 inch Diameter Agitator In a manner similar to that described above, 17.6 parts of phosphorous sludge obtained from a conventional electric phosphorus furnace were charged to a cylindrical container (Mixing Equipment Co. agitator) equipped with a 4-inch diameter propeller agitator. 36.6 parts by weight of carbon bisulfide were added to the sludge and the mixture was agitated for a period of 0.5, 1, 2, 3 and 4 minutes at an agitator speed of 570 r.p.m. This experiment was repeated two additional times for the same time period utilizing agitator speeds of 1100 r.p.m. and 1300 r.p.m. The conditions of this extraction as well as the results are set forth in table II below:

TABLE II (4" diameter agitator)

| Test | R.p.m. | Time (min.) | R.p.s. | Modified Reynolds No. | Results | K |
|---|---|---|---|---|---|---|
| AA | 570 | 0.5, 1, 2 | 4.5 | $2.5\times10^5$ | N.G. too low* | 31, 62, 125 |
| BB | 1,100 | 0.5, 1, 2, 3, 4 | 18.3 | $4.9\times10^5$ | OK** | 55, 108, 216, 324, 432 |
| CC | 1,300 | 0.5, 1, 2, 3, 4 | 21.6 | $5.9\times10^5$ | OK** | 61, 124, 248, 372, 490 |

*"N.G. too low" means that the solution produced was filtered with great difficulty. Phosphorus extraction was fair.
**"OK" means that the solution produced was readily filterable. Phosphorus extraction was good.

$P^4$ content was determined by measuring the density of the solutions and comparing with a standard curve showing $P^4$ vs. density, and also by analytical means.

The modified Reynold's numbers, times and K values as determined in examples 1 and 2 above, were employed to prepare the graphs of FIG. 1 and 2 above.

EXAMPLE 3

Additional runs were made utilizing a propeller-type agitator wherein 17.6 parts of phosphorous sludge were used to 36.6 parts of carbon bisulfide. Two agitator speeds were utilized, i.e., 800 r.p.m. and 1800 r.p.m respectively. Various runs were made utilizing identical systems, after which the resultant mixture was filtered to remove dirt particles; the carbon bisulfide fraction was stripped from the solution and the amount of phosphorous obtained was determined. The conditions and results of this experiment are set forth in table III below:

TABLE III

| R.p.m. | Agitator | Time of agitation (min.) | P4 content of solution (percent) | Modified Reynolds number |
|---|---|---|---|---|
| 800 | 4" diam | 0.5 | 29.8 | 3.5×10⁵ |
| | | 1.0 | 30.1 | |
| | | 2.0 | 30.3 | |
| | | 3.0 | 31.1 | |
| | | 4.0 | 30.8 | |
| 1,800 | do | 0.5 | 39.5 | 8.0×10⁵ |
| | | 1.0 | 39.7 | |
| | | 2.0 | 40.0 | |
| | | 3.0 | 40.0 | |
| | | 4.0 | 39.7 | |

What is claimed is:

1. A process of recovering phosphorus from phosphorus sludge comprising the steps of admixing the sludge with from about 2 to about 8 parts by weight carbon bisulfide per part by weight phosphorous sludge, agitating the mixture to a Reynold's number value of from about $2 \times 10^5$ to about $1.0 \times 10^6$ for a period of from about 0.2 minute to about 16 minutes at a temperature between about $-10°$ C. to about $80°$ C. separating particulate material from the resulting mixture containing phosphorus and thereafter recovering the phosphorus by stripping the carbon bisulfide from the mixture containing phosphorus.

2. The process of claim 1 wherein the extraction step is conducted at a temperature of from about 15° to about 45° C.

3. The process f claim 1 wherein from about 3 to 5 parts by weight carbon bisulfide are employed per part of phosphorous sludge, by weight.

4. The process of claim 1 wherein the degree of agitation employed is represented by modified Reynold's numbers is from about $4.0 \times 10^5$ to about $1.0 \times 10^6$.

5. The process of claim 1 wherein the phosphorus values are recovered from the carbon bisulfide fraction by thermal distillation.

6. The process of claim 1 being characterized by the formula:
$T = K/(N^{5/6} D^{5/3})$ wherein K has a value of from about 100 to about 600, T is approximately 2 minutes, N is the speed of the agitator in revolutions/second and D is the diameter of the agitator in feet.

7. The process of claim 1 being characterized by the formula:
$T = K/(N^{5/6} D^{5/3})$ wherein K has a value of from about 250 to about 750, T is approximately 10 minutes, N is the speed of the agitator in revolutions/second and D is diameter of the agitator in feet.

8. The process f claim 1 being characterized by the formula:
$T = K/(N^{5/6} D^{5/3})$ wherein K has a value of from about 325 to about 825, T is approximately 16 minutes, N is the speed of the agitator in revolutions/second and D is the diameter of the agitator in feet.

* * * * *

PO-1050
(5/69)

UNITED STATES PATENT OFFICE
CERTIFICATE OF CORRECTION

Patent No. 3,615,218        Dated October 26, 1972

Inventor(s) Leo B. Post and Roy E. Paul and William R. Crudup

It is certified that error appears in the above-identified patent and that said Letters Patent are hereby corrected as shown below:

Col. 1, line 38, after plants, delete are; line 62, after incomplete, insert -- extraction --.

Col. 2, line 15, that portion of the number reading $0.333 \times 10^{13}$ should read $0.333 \times 10^{-3}$; line 47, that portion of the formula reading $KX(T)$ should read $K=(T)$.

Col. 3, lines 1 and 2, after "phosphorus" delete "values are not recovered from the sludge, and the phosphorus".

Col. 4, line 4, after "periods" insert -- Reynold's numbers were calculated and the results obtained --.

Col. 5, claim 3, after "process" delete _f_ and insert -- of --.

Signed and sealed this 10th day of April 1973.

SEAL)
ttest:

EDWARD M. FLETCHER, JR.        ROBERT GOTTSCHALK
ttesting Officer        Commissioner of Patents